(12) United States Patent
Sun et al.

(10) Patent No.: US 12,544,307 B2
(45) Date of Patent: Feb. 10, 2026

(54) SEALING VALVE AND ANESTHETIC BOTTLE

(71) Applicants: LINKR MEDICAL (SHANGHAI) CO., LTD., Shanghai (CN); SHENZHEN COLINN MEDICAL CO., LTD., Guangdong (CN)

(72) Inventors: Xiangming Sun, Shanghai (CN); Hongwei Zhou, Shanghai (CN); Binbin Lei, Shanghai (CN); Gang Shen, Shanghai (CN)

(73) Assignees: LINKR MEDICAL (SHANGHAI) CO., LTD., Shanghai (CN); SHENZHEN COLINN MEDICAL CO., LTD., Guangdong (CN)

( * ) Notice: Subject to any disclaimer, the term of this patent is extended or adjusted under 35 U.S.C. 154(b) by 633 days.

(21) Appl. No.: 18/004,803

(22) PCT Filed: Dec. 2, 2022

(86) PCT No.: PCT/CN2022/136349
§ 371 (c)(1),
(2) Date: Jan. 9, 2023

(87) PCT Pub. No.: WO2024/113375
PCT Pub. Date: Jun. 6, 2024

(65) Prior Publication Data
US 2025/0090423 A1    Mar. 20, 2025

(51) Int. Cl.
*A61M 16/18*    (2006.01)
*A61J 1/14*    (2023.01)
(Continued)

(52) U.S. Cl.
CPC ........... *A61J 1/2048* (2015.05); *A61J 1/1425* (2015.05); *A61M 16/104* (2013.01); *A61M 16/18* (2013.01); *A61M 16/183* (2013.01)

(58) Field of Classification Search
CPC .................................................. A61M 16/183
(Continued)

(56) References Cited

U.S. PATENT DOCUMENTS 11,324,913 B2 * 5/2022 Bender, II ........... A61M 16/183
2010/0294277 A1   11/2010 Freed
(Continued)

FOREIGN PATENT DOCUMENTS

CN    109562021 A    4/2019
CN    110701309 A    1/2020
(Continued)

*Primary Examiner* — Reginald S Tillman, Jr.
(74) *Attorney, Agent, or Firm* — Brooks Kushman P.C.

(57) ABSTRACT

The present application discloses a sealing valve and an anesthetic bottle. The sealing valve includes a valve body and a valve core. The valve body is provided with a first end, a second end and a channel. The end surface of the first end and/or the inner wall surface of the channel are provided with a first right angle portion and a second right angle portion, the valve core is arranged in the channel, and the outer wall surface of the valve core is convexly arranged with an engagement ring. The engagement ring is provided with a conical surface and an annular groove. The conical surface can abut against the first right angle portion and the second right angle portion to close the channel, or separate from the first right angle portion and the second right angle portion to open the channel.

20 Claims, 5 Drawing Sheets

(51) Int. Cl.
*A61J 1/20* (2006.01)
*A61M 16/10* (2006.01)

(58) Field of Classification Search
USPC .......................................................... 141/349
See application file for complete search history.

(56) References Cited

U.S. PATENT DOCUMENTS

2013/0175235 A1\* 7/2013 Elsayyid ............. A61M 16/183
215/316
2016/0361514 A1\* 12/2016 Warby ................. A61M 16/104

FOREIGN PATENT DOCUMENTS

| CN | 214632997 U | 11/2021 |
| CN | 2017040760 U | 7/2022 |
| WO | 2015034978 A1 | 3/2015 |

\* cited by examiner

SEALING VALVE AND ANESTHETIC BOTTLE

CROSS REFERENCE TO RELATED APPLICATION

This application is a National Stage Application of International Patent Application No. PCT/CN2022/136349, filed on Dec. 2, 2022, the contents of all of the aforementioned application, including any intervening amendments thereto, are incorporated herein by reference.

TECHNICAL FIELD

The present application relates to the technical field of an external packaging structure, and more particularly to a sealing valve and an anesthetic bottle.

BACKGROUND

The contents recorded herein only provide background information related to the present application, and do not necessarily constitute prior art. The anesthetic bottle is mainly used to store anesthetic, and further used to connect with the anesthetic evaporator when needed, so as to introduce the anesthetic stored inside the anesthetic bottle into the anesthetic evaporator. The anesthetic bottle usually includes an anesthetic bottle body and a sealing valve, the anesthetic bottle body is provided with an accommodation cavity for containing anesthetic and a bottle opening connected with the accommodation cavity. The sealing valve includes a valve body and a valve core. The valve body is provided with a channel for the outflow of anesthetic. The first end of the valve body is sealed and inserted in the bottle opening of the anesthetic bottle body. The second end of the valve body is located outside the bottle opening and can be sealed and connected with the dosing port of the anesthetic evaporator, the valve core can be movably mounted in the channel. When the anesthetic bottle is in the storage and transportation state, the valve core is butted against the second end of the valve body to close the channel, and the anesthetic is sealed and stored in the anesthetic bottle; when the anesthetic needs to be introduced into the anesthetic evaporator, the valve core and the second end of the valve body are separated from each other, the channel is open, and the anesthetic in the anesthetic bottle can be transferred to the anesthetic evaporator through the channel.

SUMMARY

An object of an embodiment of the present application is to provide a sealing valve and an anesthetic bottle.

The technical solution adopted in an embodiment of the present application is that:

In a first aspect, a sealing valve is provided, and the sealing valve includes:
- a valve body, providing with a first end and a second end arranged opposite to each other, the first end being configured to connect to a bottle opening of an external anesthetic bottle, the second end being configured to connect a dosing port of an external anesthetic evaporator, the valve body is provided with a channel penetrating through the valve body in a direction from the first end to the second end, a first right angle portion and a second right angle portion are formed on an end surface of the first end and/or an inner wall surface of the channel, both the first right angle portion and the second right angle portion are annular structures surrounding the channel, the first right angle portion is located at a periphery of the second right angle portion, and the first right angle portion and the second right angle portion are arranged sequentially from the first end to the second end; and
- a valve core, movably arranged in the channel, an engagement ring is arranged to be protruded from a peripheral surface of the valve core, the engagement ring is arranged around an axis of the valve core, a side of the engagement ring adjacent to the first right angle portion is provided with a conical surface being gradually reduced in diameter from the first end to the second end, the conical surface is able to be sealed against the first right angle portion and the second right angle portion to close the channel, or be separated from the first right angle portion and the second right angle portion to open the channel; a side of the engagement ring away from the first right angle portion is provided with an annular groove arranged around the axis of the valve core.

In an embodiment, the inner wall surface of the channel comprises a first cylindrical surface, a step surface and a second cylindrical surface arranged sequentially from the first end to the second end, the first cylindrical surface is connected with the end surface of the first end, an axial direction of the first cylindrical surface is perpendicular to the end surface of the first end, the first cylindrical surface is connected with the end surface of the first end to form the first right angle portion, the step surface is parallel to the end surface of the first end, the second cylindrical surface is coaxially arranged with the first cylindrical surface, an inner diameter of the second cylindrical surface is smaller than an inner diameter of the first cylindrical surface, and the second cylindrical surface is connected with the step surface to form the second right angle portion.

In an embodiment, an arctangent function value of a ratio of a width of the step surface to a height of the first cylindrical surface is less than a slope of the conical surface.

In an embodiment, the slope of the conical surface is ranged from 20 degree to 60 degree, and the arctangent function value of the ratio of the width of the step surface to the height of the first cylindrical surface is ranged from 15 degree to 55 degree.

In an embodiment, a normal line at a junction of the conical surface and the first right angle portion passes through the annular groove, and a normal line at a junction of the conical surface and the second right angle portion is located at a side of the annular groove.

In an embodiment, a hardness of the valve core is lower than that of the valve body.

In an embodiment, the valve core is a low-density polyethylene valve core and the valve body is a high-density polyethylene valve body.

In an embodiment, the sealing valve further includes: an elastic member; and a mounting seat, configured for mounting the elastic member; the mounting seat is provided with a mounting cavity, an opening and a flow passage that are respectively in communication with the mounting cavity, an end of the mounting seat where the opening is provided is connected to the valve body, an end of the valve core where the engagement ring is provided is placed into the mounting cavity through the opening, the elastic member is abutted between the end of the valve core where the engagement ring is provided and an end of the mounting seat away from the opening, and the elastic member is configured to provide a restoring force for the valve core to move towards the second end.

In an embodiment, an outer wall surface of the valve body is provided with a flange extending radially outwards toward the valve body, a surface of the flange adjacent to the first end is provided with an annular connection portion extending axially along the valve body, an inner wall surface of the annular connection portion is provided with a first convex ring, an outer wall surface of the end of the mounting seat where the opening is provided is provided with a second convex ring, and the second convex ring is able to be buckled into a side of the first convex ring adjacent to the flange, such that the mounting base is in an interference fit with the annular connection portion.

In an embodiment, an outer peripheral surface of the annular connection portion is provided with a third convex ring protruding towards an outer portion of the annular connection portion, and the third convex ring is configured to be abutted against an inner wall surface of the bottle opening of the anesthetic bottle.

In an embodiment, the sealing valve further includes a thermoplastic elastomer sealing ring configured to seal a gap between the first end and the anesthetic bottle body.

In a second aspect, an anesthetic bottle is provided, and the anesthetic bottle includes an anesthetic bottle body and a sealing valve mentioned above, and the anesthetic bottle body is provided with an accommodation cavity and a bottle opening in communication with the accommodation cavity, the sealing valve is sealed and mounted onto the bottle opening, and a first end and a second end of the valve body are respectively located inside and outside the accommodation cavity.

The beneficial effect of the sealing valve provided by the embodiment of the present application is that: the sealing valve provided by the present application includes a valve body and a valve core, the valve body is provided with a first end, a second end and a channel; the end surface of the first end and/or the inner wall surface of the channel are formed with the first right angle portion and the second right angle portion that both surround the channel, and the first right angle portion is located on the periphery of the second right angle portion, the first right angle portion and the second right angle portion are sequentially arranged from the first end to the second end; the valve core is arranged in the channel, the peripheral surface of the valve core is convex with the engagement ring, the side of the engagement ring adjacent to the first right angle portion is provided with the conical surface, the conical surface is gradually reduced in diameter from the first end to the second end, the conical surface is able to be sealed against the first right angle portion and the second right angle portion to close the channel, or be separated from the first right angle portion and the second right angle portion to open the channel; and the side of the engagement ring away from the first right angle portion is provided with an annular groove arranged around the axis of the valve core.

The beneficial effect of the anesthetic bottle provided by the embodiment of the present application is that the anesthetic bottle includes an anesthetic bottle body and a sealing valve, the anesthetic bottle body is provided with an accommodation cavity and a bottle opening in communication with the accommodation cavity, the sealing valve is sealed and mounted at the bottle opening, and the first end and the second end of the valve body are respectively located inside and outside the accommodation cavity.

BRIEF DESCRIPTION OF THE DRAWINGS

In order to more clearly describe the technical solution in the embodiments of the present application, the following will briefly introduce the drawings needed in the embodiments or exemplary technical descriptions. Obviously, the drawings in the following description are only some embodiments of the present application. For ordinary technicians in the field, they can also obtain other drawings based on these drawings without paying creative labor.

10—anesthetic bottle; 100—sealing valve; 110—valve body; 111—first end; 112—second end; 113—channel; 1131—first cylindrical surface; 1132—step surface; 1133—second cylindrical surface; 114—first right angle portion; 115—second right angle portion; 116—flange; 117—annular connection portion; 1171—first convex ring; 1172—third convex ring; 120—valve core; 121—engagement ring; 1211—conical surface; 1212—annular groove; 130—elastic member; 140—mounting seat; 142—opening; 143—flow passage; 144—second convex ring; 150—thermoplastic elastomer sealing ring; 200—anesthetic bottle body; 210—accommodation cavity; 220—bottle opening; W—width of step surface; H—height of the first cylindrical surface; a—arctangent function value of a ratio of the width W of the step surface and the height H of the first cylindrical surface; β—slope of conical surface; L1—normal line at the junction of the conical surface and the first right angle portion; L2—normal line at the junction of the conical surface and the second right angle portion.

DETAILED DESCRIPTION

In order to make the purpose, the technical solution and the advantages of the present application be clearer and more understandable, the present application will be further described in detail below with reference to accompanying figures and embodiments. It should be understood that the specific embodiments described herein are merely intended to illustrate but not to limit the present application.

It is noted that when a component is referred to as being "fixed to" or "disposed on" another component, it can be directly or indirectly on another component. When a component is referred to as being "connected to" another component, it can be directly or indirectly connected to another component. The terms such as "up", "down", "front", "inside", "outside", and so on are the directions or location relationships shown in the accompanying figures, which are only intended to describe the present application conveniently and simplify the description, but not to indicate or imply that an indicated device or component must have specific locations or be constructed and manipulated according to specific locations; therefore, these terms shouldn't be considered as any limitation to the present application. In addition, terms "the first" and "the second" are only used in describe purposes, and should not be considered as indicating or implying any relative importance, or impliedly indicating the number of indicated technical features, "a plurality of" means two or more, unless there is additional explicit and specific limitation.

In order to explain the technical solution provided by the present application, the following will be described in detail in combination with the specific drawings and embodiments.

Figure 1:
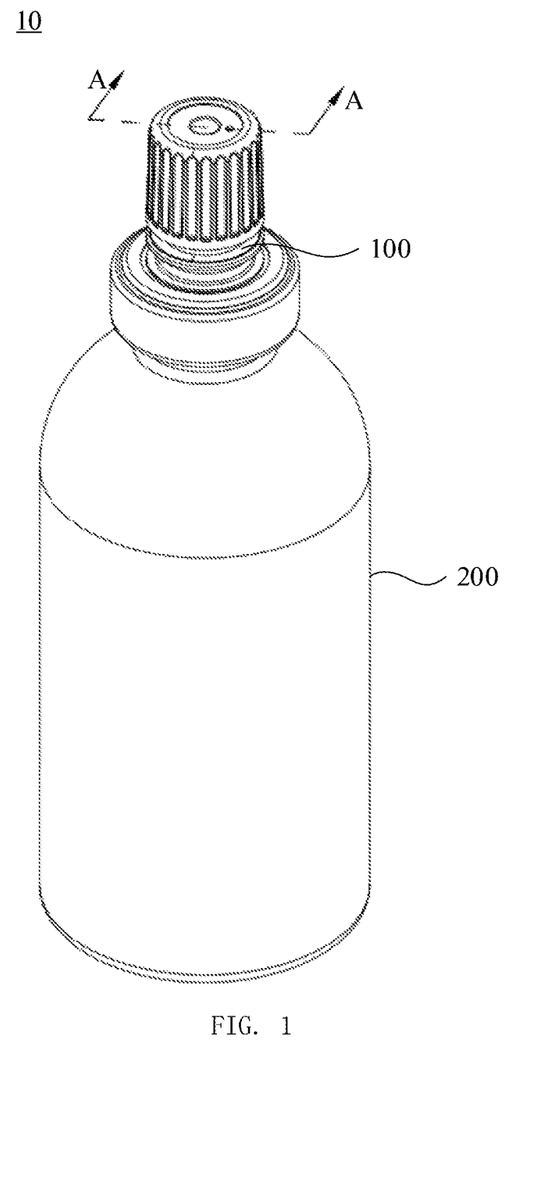
FIG. 1 is a structural view of an anesthetic bottle provided by an embodiment of the present application.
Figure 2:
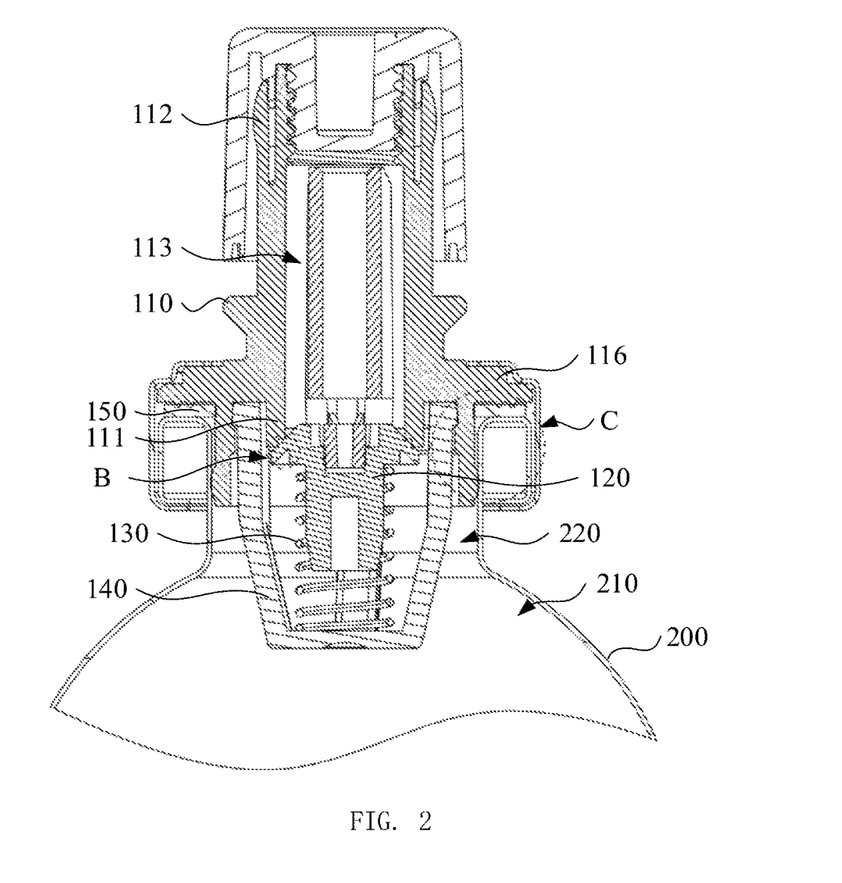
FIG. 2 is a sectional view along a direction of A-A of an anesthetic bottle shown in FIG. 1.
Figure 3:
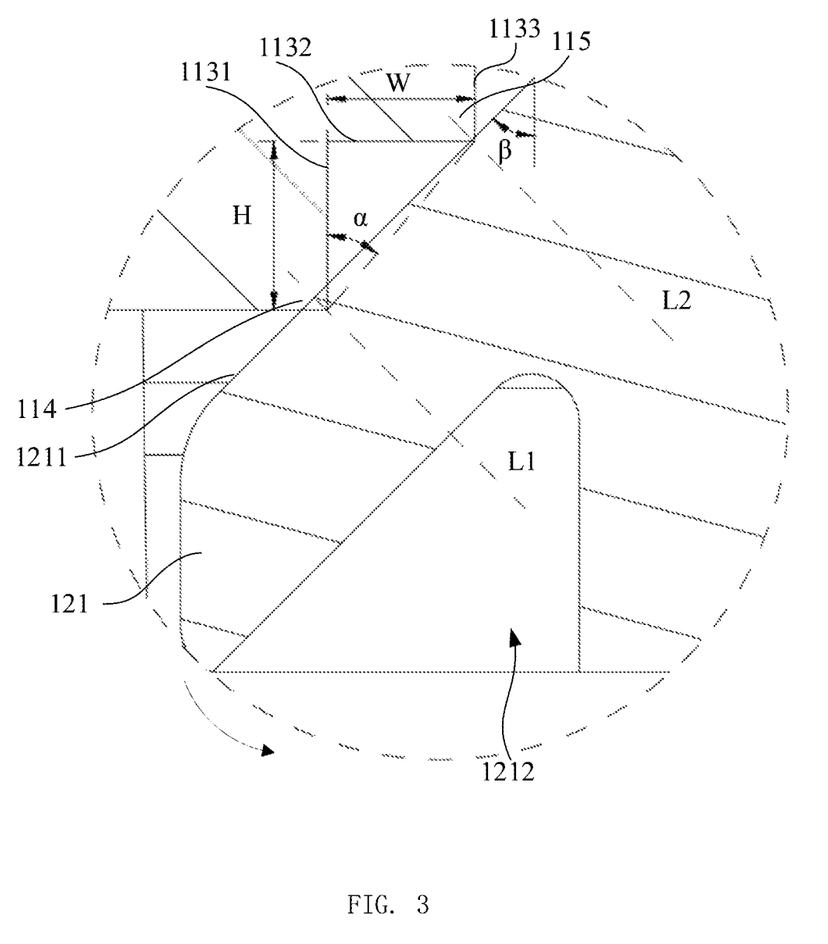
FIG. 3 is an enlarged view at position B of a sectional view along a direction of A-A of an anesthetic bottle shown in FIG. 2.

Some embodiments of the present application provide a sealing valve 100. As shown in FIG. 1 to FIG. 3. The sealing valve 100 can be used for the anesthetic bottle 10. The anesthetic bottle 10 includes a sealing valve 100 and an anesthetic bottle body 200. The anesthetic bottle body 200 is provided with an accommodation cavity 210 and a bottle opening 220 connected with the accommodation cavity 210. The sealing valve 100 is sealed and mounted on the bottle opening 220, the sealing valve 100 includes a valve body 110 and a valve core 120. The valve body 110 is provided with a first end 111 and a second end 112 that are arranged opposite to each other. The first end 111 is used to connect the bottle opening 220 of the anesthetic body 10, and the second end 112 is used to connect the dosing port of the external anesthetic evaporator. The valve body 110 is provided with a channel 113 passing through the valve body 110 in the direction from the first end 111 to the second end 112, the end surface of the first end 111 and/or the inner wall surface of the channel 113 are formed with the first right angle portion 114 and the second right angle portion 115. The first right angle portion 114 and the second right angle portion 115 are annular structures surrounding the channel 113. The first right angle portion 114 is located at the periphery of the second right angle portion 115, and the first right angle portion 114 and the second right angle portion 115 are sequentially arranged in the direction from the first end 111 to the second end 112. The valve core 120 is movably arranged in the channel 113. The peripheral surface of the valve core 120 is convex with the engagement ring 121, which is arranged around the axis of the valve core 120. The side of the engagement ring 121 adjacent to the first right angle portion 114 is provided with a conical surface 1211 being gradually reduced in diameter from the first end 111 to the second end 112, the conical surface 1211 is able to be sealed against the first right angle portion 114 and the second right angle portion 115 to close the channel 113, or be separated from the first right angle portion 114 and the second right angle portion 115 to open the channel 113; and a side of the engagement ring 121 away from the first right angle portion 114 is provided with an annular groove 1212 arranged around the axis of the valve core 120.

Specifically, both the first right angle portion 114 and the second right angle portion 115 are respectively provided with two surfaces connected to each other. For the same right angle portion, the interconnected two surfaces intersect in space, and the connection of the two surfaces is not chamfered or rounded to form a right angle. The right angle portion is abutted against the conical surface 1211 through the right angle; the two surfaces forming a right angle can both be a part of the inner wall surface of channel 113, or a part of the end surface of first end 111, or one of them can be a part of the inner wall surface of channel 113, and the other can be a part of the end surface of first end 111. For example, the outer surface of the first right angle portion 114 includes a plane and a cylindrical surface that are connected with each other. The plane is a part of the end surface of the first end 111, and the cylindrical surface is a part of the inner wall of the channel 113. The first right angle portion 114 is abutted against the conical surface 1211 of the valve core 120 through a right angle formed at the connection between the plane and the cylindrical surface.

Specifically, the shape of the cross-section of the annual groove 1212 can be a rounded triangle, a triangle, a semicircle and other shapes, which can be provided as required, and does not limit herein.

The sealing valve 100 provided in the embodiment connects the first end 111 of the valve body 110 to the bottle opening 220 of the anesthetic bottle 10 in a sealed manner, so that the valve core 120 can move to the area with larger diameter of the conical surface 1211 of the valve core 120 in the channel 113 and butts against the first right angle portion 114 of the valve body 110, to form a first sealing between the valve body 110 and the valve core 120; and the valve core 120 can move to the area with smaller diameter of the conical surface 1211 of the valve core 120 in the channel 113 and butts against the second right angle portion 115 of the valve body 110, to form a second sealing between the valve body 110 and the valve core 120, therefore, a double sealing structure is formed. The sealing effect between the valve body 110 and the valve core 120 is better, and the anesthetic inside the anesthetic bottle 10 is well sealed in the anesthetic bottle body 200; the second end 112 of the valve body 110 is sealed and connected to the dosing port of the external anesthetic evaporator. The medicine tube and other structures of the external anesthetic evaporator can abut against the valve core 120, so that the valve core 120 moves to the conical surface 1211 of the valve core 120 in the channel 113 and is separated from the first right angle portion 114 and the second right angle portion 115, so that the channel 113 can be opened, the anesthetic in the anesthetic bottle 10 can be transferred to the anesthetic evaporator through channel 113 to export the anesthetic.

Compared with the prior art, the sealing valve 100 provided in the present application can be abutted against the first right angle portion 114 of the valve body 110 in the area with larger diameter of the conical surface 1211 of the valve core 120, and can be abutted against the second right angle portion 115 of the valve body 110 in the area with smaller diameter of the conical surface 1211 of the valve core 120, therefore, a double sealing between the valve core 120 and the valve body 110 can be formed, and the sealing effect is better. In addition, the valve core 120 is directly abutted against the valve body 110 to form the sealing between the valve core 120 and the valve body 110, and there is no need to provide a seal between the valve core 120 and the valve body 110, thus the problem of decreasing the purity of anesthetic caused by the migration and dissolution of antioxidants in the seal in the anesthetic can be avoided.

In addition, since the engagement ring 121 is provided with an annual groove 1212 on the side away from the first right angle portion 114, on the one hand, when the first right angle portion 114 is abutted against the conical surface 1211, the first right angle portion 114 can be abutted against the engagement ring 121, such that the engagement ring 121 is slightly bent in the direction (the direction shown by the arrow at the bottom left in FIG. 3) adjacent to the annual groove 1212, that is, the engagement ring 121 is slightly bent and deformed in the direction adjacent to the axis of the valve core 120, in this way, the interior of the engagement ring 121 will generate a force to restore the original state, and the force to restore the original state generated in the engagement ring 121 will urge the engagement ring 121 to attach to the first right angle portion 114, that is, the conical surface 1211 is urged to attach to the first right angle portion 114, which is conducive to achieving a more tight sealing effect; on the other hand, the internal pressure of the anesthetic bottle body 200 will also urge the engagement ring 121 to attach to the first right angle portion 114, and the greater the internal pressure of the anesthetic bottle body 200, the more obvious the pushing effect on the engagement ring 121. In addition, due to the small bending deformation of the annual groove 1212, which is beneficial for the valve core 120 to continue moving towards the direction adjacent to the second end 112 to contact the second right angle portion 115 to form a second sealing.

In another embodiment of the present application, as shown in FIG. 3. The inner wall surface of the channel 113 includes a first cylindrical surface 1131, a step surface 1132 and a second cylindrical surface 1133 arranged sequentially from the first end 111 to the second end 112. The first cylindrical surface 1131 is connected with the end surface of the first end 111, and the axis of the first cylindrical surface 1131 is perpendicular to the end surface of the first end 111, the first cylindrical surface 1131 is connected with the end surface of the first end 111 to form the first right angle portion 114, the step surface 1132 is parallel to the end surface of the first end 111, the second cylindrical surface 1133 is arranged coaxially with the first cylindrical surface 1131, and the inner diameter of the second cylindrical surface 1133 is smaller than the inner diameter of the first cylindrical surface 1131, and the second cylindrical surface 1133 is connected with the step surface 1132 to form the second right angle portion 115.

In the sealing valve 100 provided by the embodiment of the present application, the right angles of the first right angle portion 114 and the second right angle portion 115 are all 90 degree. The processing procedure of the first right angle portion 114 and the second right angle portion 115 is simple, the molding error is smaller, and the structural strength is better.

Specifically, the slope β of the conical surface can be arranged to 45 degree. In this way, since the right angles of the first right angle portion 114 and the second right angle portion 115 are all 90 degree, the first right angle portion 114 and the conical surface can be directly butted along the normal line L1 at the junction of the conical surface 1211 and the first right angle portion, and similarly, the second right angle portion 115 and the conical surface can be directly butted along the normal line L2 at the junction of the conical surface 1211 and the second right angle portion. Therefore, the sealing effect between valve core 120 and valve body 110 is better.

In another embodiment of the present application, as shown in FIG. 3, the arctangent function value a of the ratio of the width W of the step surface 1132 to the height H of the first cylindrical surface is less than the slope β of the conical surface 1211.

In the sealing valve 100 provided in the embodiment, when the valve core 120 moves towards the second end 112 of the valve body 110, the conical surface 1211 of the valve core 120 will firstly abut against the first right angle portion 114 of the valve body 110. When the valve core 120 further moves towards the second end 112 of the valve body 110, the conical surface 1211 of the valve core 120 will abut against the second right angle portion 115 of the valve body 110, that is, the deformation of conical surface 1211 at the junction with the first right angle portion 114 is larger than that at the junction with the second right angle portion 115. With this arrangement, the larger deformation formed between conical surface 1211 and the first right angle portion 114 can be used to obtain a more tight sealing effect, since the deformation between the conical surface 1211 and the first right angle portion 114 is greater than the deformation between the conical surface 1211 and the second right angle portion 115, the sealing effect between the conical surface 1211 and the first right angle portion 114 is more vulnerable to the influence of structural strength, opening and closing times of valve core 120 and valve body 110, machining accuracy and other parameters, and the sealing effect is weakened. In this way, with the arrangement of the second right angle portion 115, which can further play a sealing role after the sealing effect between the first right angle portion 114 and the conical surface 1211 is weakened or invalid, so as to ensure that the anesthetic does not leak out and improve the reliability of the seal.

In another embodiment of the present application, as shown in FIG. 3. The normal line L1 of at the junction of the conical surface 1211 and the first right angle portion 114 passes through the annual groove 1212; the normal line L2 at the junction of the conical surface 1211 and the second right angle portion 115 is located on one side of the annual groove 1212. In other words, the normal line L2 at the junction of the conical surface 1211 and the second right angle portion 115 does not pass through the annual groove 1212.

In the sealing valve 100 provided in the embodiment, which can ensure that when the first right angle portion 114 is butted against the engagement ring 121, the first right angle portion 114 is butted against an area on the engagement ring 121 that is easier to be deformed, and when the second right angle portion 115 is butted against the engagement ring 121, the second right angle portion 115 is butted against an area on the engagement ring 121 that is not easy to be deformed, which can prevent the engagement ring 121 from bending and deforming towards the axis of valve core 120 at a position used to be abutted against the second right angle portion 115, since the engagement ring 121 may not be able to abut against the second right angle portion 115 due to bending and deforming of the engagement ring 121 towards the axis of valve core 120 at the position used to abut against the second right angle portion 115, therefore, the above arrangement can ensure that the first right angle portion 114 and the second right angle portion 115 are effectively abutted against the conical surface 1211.

In another embodiment of the present application, the hardness of valve core 120 is lower than that of the valve body 110. With this arrangement, the first right angle portion 114 of the valve body 110 can effectively cause elastic deformation of the surface of the valve core 120, and can also effectively abut against the engagement ring 121, so that the engagement ring 121 can bend and deform slightly in the direction adjacent to the annual groove 1212. The second right angle portion 115 of the valve core 120 can also effectively cause elastic deformation of the surface of the valve core 120.

Specifically, the valve core 120 can be a low density polyethylene valve core 120, and valve body 110 can be a high density polyethylene valve body 110.

Figure 5:
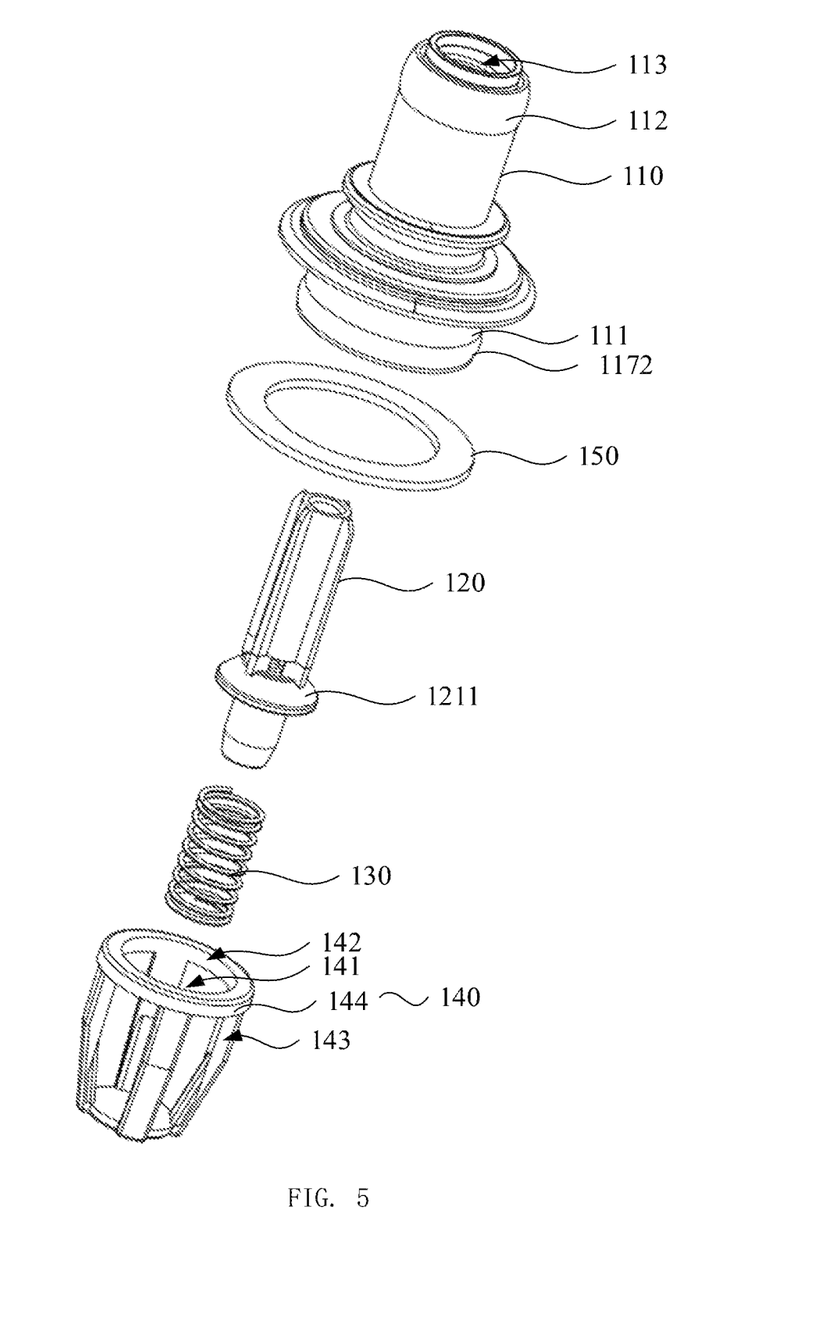
FIG. 5 shows an explosive structural view of a sealing valve provided in an embodiment of the present application.

In another embodiment of the present application, as shown in FIG. 2 and FIG. 5. The sealing valve 10 further includes an elastic member 130 and a mounting seat 140 for mounting the elastic member 130. Specifically, the elastic member 130 is a spring; the mounting seat 140 is provided with a mounting cavity 141, and a flow message 143 and an opening 142 that are in communication with the mounting cavity 141 respectively. An end of the mounting seat 140 provided with the opening 142 is connected to the valve body 110, and an end of the valve core 120 provided with the engagement ring 121 is placed in the mounting cavity 141, and the elastic member 130 is abutted between an end of the valve core 120 provided with the engagement ring 121 and an end of the mounting seat 140 away from the opening 142, and the elastic member is used to provide a restoring force for the valve core 120 to move towards the second end 112.

In the sealing valve 100 provided in the embodiment, the elastic member 130 can abut against the valve core 120 when the anesthetic bottle 10 is in the storage and transportation state, such that the conical surface 1211 of the valve core 120 is abutted against the first right angle portion 114 and the second right angle portion 115 of the valve body 110, and then the channel 113 is closed, and the anesthetic is sealed in the anesthetic bottle body 200; when it is necessary to export the anesthetic in the anesthetic bottle 10 to the external anesthetic evaporator, the anesthetic can enter the channel 113 from the second end 112 of the valve body 110 using the medicine tube and other structures of the anesthetic evaporator, the elastic force of the elastic member 130 can be overcome by the external force to move the valve core 120 towards the first end 111, then, the conical surface 1211 of valve core 120 is separated from the first right angle portion 114 and the second right angle portion 115, and the channel 113 is opened. The anesthetic can be introduced into the anesthetic evaporator through the flow passage 143, the mounting cavity 141, and the channel 113 sequentially, so as to realize the export of anesthetic.

Figure 4:
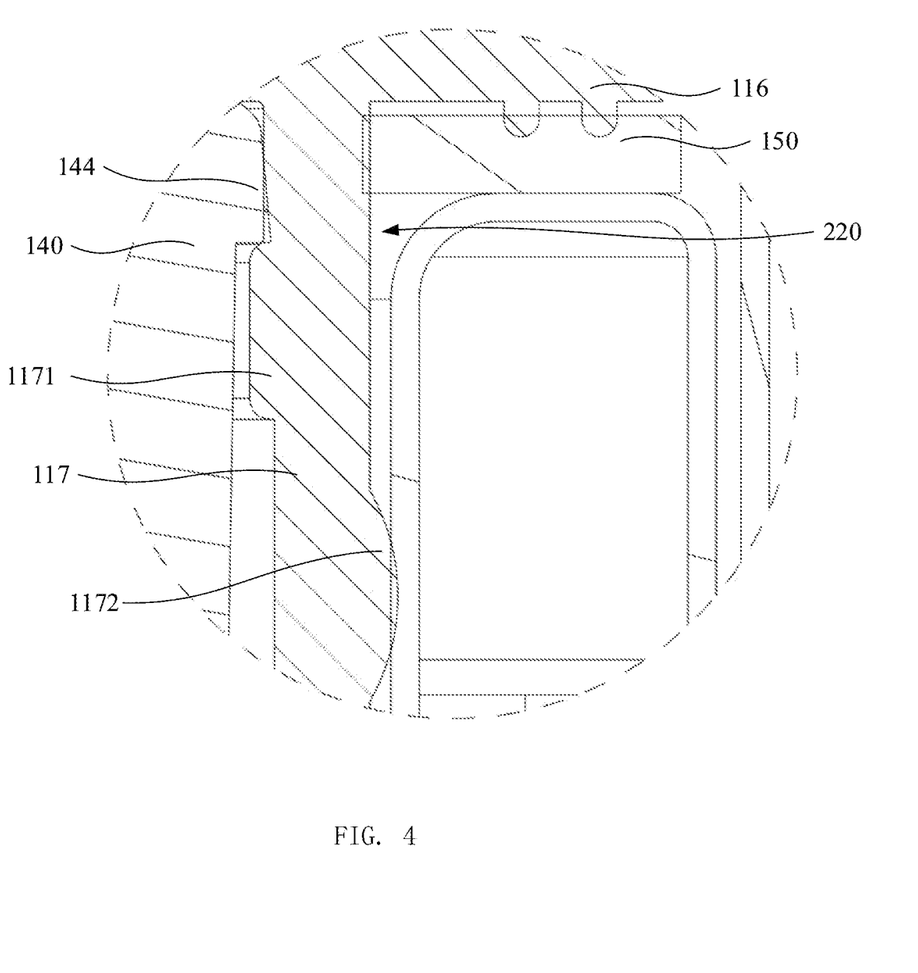
FIG. 4 is an enlarged view at position C of a sectional view along a direction of A-A of an anesthetic bottle shown in FIG. 2.

In another embodiment of the present application, as shown in FIG. 2 and FIG. 4. As a connection method of the mounting seat 140 and valve body 110, the outer wall surface of valve body 110 is provided with a flange 116 extending radially outwards toward the valve body 110, the surface of flange 116 adjacent to the first end 111 is provided with an annual connection portion 117 extending along the axial direction of valve body 110, and the inner wall surface of annual connection portion 117 is provided with a first convex ring 1171, an end of the outer wall surface of the mounting seat 140 provided with the opening 142 is provided with a second convex ring 144, which can be buckled into the side of the first convex ring 1171 adjacent to the flange 116, such that the mounting seat 140 is in an interference fit with the annual connection portion 117.

In the sealing valve 100 provided in the embodiment of the present application, the inner wall surface of the annual connection portion 117 is provided with a full circle of first convex ring 1171. The full circle of first convex ring 1171 can effectively restrict the separation of mounting seat 140 from the annual connection portion 117, which can ensure that the mounting seat 140 can still be fixedly connected to the annual connection portion 117 when the abutting force between the valve body 110 and the valve core 120 is larger, the risk of loosening of mounting seat 140 can be reduced.

In another embodiment of the present application, as shown in FIG. 2 and FIG. 5. The outer peripheral surface of the annual connection portion 117 is provided with a third convex ring 1172 projecting toward the outer portion of the annular connection portion 117, and the third convex ring 1172 is used to abut against the inner wall surface of the bottle opening 220 of the anesthetic bottle 10.

Generally, when the sealing valve 100 is mounted onto the bottle opening 220, a seal will be provided between the side of the flange 116 adjacent to the first end 111 and the end surface of bottle opening 220. In the sealing valve 100 provided in the embodiment, the third convex ring 1172 can be abutted against the inner wall surface of the bottle opening 220 when the sealing valve 100 is connected to the bottle opening 220 of anesthetic bottle 10, such that the gap between the annual connection portion 117 and the inner wall surface of the bottle opening 220 can be sealed, and the anesthetic can be avoided from contacting with the sealing member between the flange 116 and the end surface of the bottle opening 220.

In another embodiment of the present application, as shown in FIG. 4 and FIG. 5. The sealing valve 100 further includes a thermoplastic elastomer sealing ring 150, which is used to seal the gap between first end 111 and anesthetic bottle body 200.

Specifically, the thermoplastic elastomer sealing ring 150 can be clamped between the surface of the flange 116 adjacent to first end 111 and the end surface of bottle opening 220, and the thermoplastic elastomer sealing ring 150 is used to sealingly mount the first end 111 in the bottle opening.

In the sealing valve 100 provided in the embodiment, the thermoplastic elastomer sealing ring 150 is made of a thermoplastic elastomer. The thermoplastic elastomer sealing ring 150 can be directly molded by injection molding machine in the production process, and can produce high-purity sealing ring without adding other substances. In this way, even if the thermoplastic elastomer sealing ring 150 is in contact with anesthetic, there will be no antioxidant and other substances dissolved in the anesthetic, which can meet the requirements for drug compatibility of the valve for inhalation anesthetic drug packaging materials, and is conducive to ensuring the purity of the anesthetic.

As shown in FIG. 1 and FIG. 2, the present application further provides an anesthetic bottle 10, which includes an anesthetic bottle body 200 and the above sealing valve 100. The anesthetic bottle body 200 is provided with an accommodation cavity 210 and a bottle opening 220 in communication with the accommodation cavity 210, and the sealing valve 100 is sealed and mounted onto the bottle opening 220, and the first end 111 and the second end 112 of the valve body 110 are located inside and outside the accommodation cavity 210, respectively.

In the anesthetic bottle 10 provided in the embodiment, the conical surface 1211 of the valve core 120 of the anesthetic bottle 10 can be butted against the first right angle portion 114 and the second right angle portion 115 of the valve body 110, so as to form a double sealing between the valve core 120 and the valve body 110, the sealing effect is better. In addition, the valve core 120 is directly butted against the valve body 110 for sealing, and there is no need to set an additional sealing member between the valve core 120 and the valve body 110, thus, the problem of decreasing the purity of anesthetic caused by the migration and dissolution of antioxidants in the sealing member into the anesthetic can be avoided.

The above is only an optional embodiment of the present application and is not intended to limit the present application. For those skilled in the art, the present application may have various changes and variations. Any modification, equivalent replacement, improvement, etc. made within the spirit and principles of the present application shall be included in the claims of the present application.

The invention claimed is:

1. A sealing valve, comprising:
    a valve body, providing with a first end and a second end arranged opposite to each other, the first end being configured to connect to a bottle opening of an external anesthetic bottle, the second end being configured to connect a dosing port of an external anesthetic evaporator, wherein the valve body is provided with a channel penetrating through the valve body in a direction from the first end to the second end, a first right angle portion and a second right angle portion are formed on an end surface of the first end and/or an inner wall surface of the channel, both the first right angle portion and the second right angle portion are annular structures surrounding the channel, the first right angle portion is located at a periphery of the second right angle portion, and the first right angle portion and the second right angle portion are arranged sequentially from the first end to the second end; and a valve core, movably arranged in the channel, wherein an engagement ring is arranged to be protruded from a peripheral surface of the valve core, the engagement ring is arranged around an axis of the valve core, a side of the engagement ring adjacent to the first right angle portion is provided with a conical surface being gradually reduced in diameter from the first end to the second end, the conical surface is able to be sealed against the first right angle portion and the second right angle portion to close the channel, or be separated from the first right angle portion and the second right angle portion to open the channel; a side of the engagement ring away from the first right angle portion is provided with an annular groove arranged around the axis of the valve core.

2. The sealing valve according to claim 1, wherein the inner wall surface of the channel comprises a first cylindrical surface, a step surface and a second cylindrical surface arranged sequentially from the first end to the second end, the first cylindrical surface is connected with the end surface of the first end, an axial direction of the first cylindrical surface is perpendicular to the end surface of the first end, the first cylindrical surface is connected with the end surface of the first end to form the first right angle portion, the step surface is parallel to the end surface of the first end, the second cylindrical surface is coaxially arranged with the first cylindrical surface, an inner diameter of the second cylindrical surface is smaller than an inner diameter of the first cylindrical surface, and the second cylindrical surface is connected with the step surface to form the second right angle portion; and an arctangent function value of a ratio of a width of the step surface to a height of the first cylindrical surface is less than a slope of the conical surface.

3. The sealing valve according to claim 1, wherein a normal line at a junction of the conical surface and the first right angle portion passes through the annular groove, and a normal line at a junction of the conical surface and the second right angle portion is located at a side of the annular groove.

4. The sealing valve according to claim 1, wherein a hardness of the valve core is lower than that of the valve body.

5. The sealing valve according to claim 1, wherein the valve core is a low-density polyethylene valve core and the valve body is a high-density polyethylene valve body.

6. The sealing valve according to claim 1, further comprising: an elastic member; and a mounting seat, configured for mounting the elastic member; wherein the mounting seat is provided with a mounting cavity, an opening and a flow passage that are respectively in communication with the mounting cavity, an end of the mounting seat where the opening is provided is connected to the valve body, an end of the valve core where the engagement ring is provided is placed into the mounting cavity through the opening, the elastic member is abutted between the end of the valve core where the engagement ring is provided and an end of the mounting seat away from the opening, and the elastic member is configured to provide a restoring force for moving the valve core towards the second end.

7. The sealing valve according to claim 6, wherein an outer wall surface of the valve body is provided with a flange extending radially outwards toward the valve body, a surface of the flange adjacent to the first end is provided with an annular connection portion extending axially along the valve body, an inner wall surface of the annular connection portion is provided with a first convex ring, an outer wall surface of the end of the mounting seat where the opening is provided is provided with a second convex ring, and the second convex ring is able to be buckled into a side of the first convex ring adjacent to the flange, such that the mounting base is in an interference fit with the annular connection portion.

8. The sealing valve according to claim 7, wherein an outer peripheral surface of the annular connection portion is provided with a third convex ring protruding towards an outer portion of the annular connection portion, and the third convex ring is configured to be abutted against an inner wall surface of the bottle opening of the anesthetic bottle.

9. The sealing valve according to claim 1, further comprising a thermoplastic elastomer sealing ring configured to seal a gap between the first end and the anesthetic bottle body.

10. An anesthetic bottle, comprising an anesthetic bottle body and a sealing valve, the sealing valve comprises:

a valve body, providing with a first end and a second end arranged opposite to each other, the first end being configured to connect to a bottle opening of an external anesthetic bottle, the second end being configured to connect a dosing port of an external anesthetic evaporator, wherein the valve body is provided with a channel penetrating through the valve body in a direction from the first end to the second end, a first right angle portion and a second right angle portion are formed on an end surface of the first end and/or an inner wall surface of the channel, both the first right angle portion and the second right angle portion are annular structures surrounding the channel, the first right angle portion is located at a periphery of the second right angle portion, and the first right angle portion and the second right angle portion are arranged sequentially from the first end to the second end; and a valve core, movably arranged in the channel, wherein an engagement ring is arranged to be protruded from a peripheral surface of the valve core, the engagement ring is arranged around an axis of the valve core, a side of the engagement ring adjacent to the first right angle portion is provided with a conical surface being gradually reduced in diameter from the first end to the second end, the conical surface is able to be sealed against the first right angle portion and the second right angle portion to close the channel, or be separated from the first right angle portion and the second right angle portion to open the channel; a side of the engagement ring away from the first right angle portion is provided with an annular groove arranged around the axis of the valve core; and wherein the anesthetic bottle body is provided with an accommodation cavity and a bottle opening in communication with the accommodation cavity, the sealing valve is sealed and mounted onto the bottle opening, and a first end and a second end of the valve body are respectively located inside and outside the accommodation cavity.

11. The anesthetic bottle according to claim 10, wherein the inner wall surface of the channel comprises a first cylindrical surface, a step surface and a second cylindrical surface arranged sequentially from the first end to the second end, the first cylindrical surface is connected with the end surface of the first end, an axial direction of the first cylindrical surface is perpendicular to the end surface of the first end, the first cylindrical surface is connected with the end surface of the first end to form the first right angle portion, the step surface is parallel to the end surface of the first end, the second cylindrical surface is coaxially arranged with the first cylindrical surface, an inner diameter of the second cylindrical surface is smaller than an inner diameter of the first cylindrical surface, and the second cylindrical surface is connected with the step surface to form the second right angle portion; and an arctangent function value of a ratio of a width of the step surface to a height of the first cylindrical surface is less than a slope of the conical surface.

12. The anesthetic bottle according to claim 10, wherein a normal line at a junction of the conical surface and the first right angle portion passes through the annular groove, and a normal line at a junction of the conical surface and the second right angle portion is located at a side of the annular groove.

13. The sealing anesthetic bottle according to claim 10, wherein a hardness of the valve core is lower than that of the valve body.

14. The anesthetic bottle according to claim 10, wherein the valve core is a low-density polyethylene valve core and the valve body is a high-density polyethylene valve body.

15. The anesthetic bottle according to claim 10, further comprising:
an elastic member; and
a mounting seat, configured for mounting the elastic member;
wherein the mounting seat is provided with a mounting cavity, an opening and a flow passage that are respectively in communication with the mounting cavity, an end of the mounting seat where the opening is provided is connected to the valve body, an end of the valve core where the engagement ring is provided is placed into the mounting cavity through the opening, the elastic member is abutted between the end of the valve core where the engagement ring is provided and an end of the mounting seat away from the opening, and the elastic member is configured to provide a restoring force for moving the valve core towards the second end.

16. The anesthetic bottle according to claim 15, wherein an outer wall surface of the valve body is provided with a flange extending radially outwards toward the valve body, a surface of the flange adjacent to the first end is provided with an annular connection portion extending axially along the valve body, an inner wall surface of the annular connection portion is provided with a first convex ring, an outer wall surface of the end of the mounting seat where the opening is provided is provided with a second convex ring, and the second convex ring is able to be buckled into a side of the first convex ring adjacent to the flange, such that the mounting base is in an interference fit with the annular connection portion.

17. The anesthetic bottle according to claim 16, wherein an outer peripheral surface of the annular connection portion is provided with a third convex ring protruding towards an outer portion of the annular connection portion, and the third convex ring is configured to be abutted against an inner wall surface of the bottle opening of the anesthetic bottle.

18. The anesthetic bottle according to claim 10, further comprising a thermoplastic elastomer sealing ring configured to seal a gap between the first end and the anesthetic bottle body.

19. The sealing valve according to claim 2, further comprising:
an elastic member; and
a mounting seat, configured for mounting the elastic member;
wherein the mounting seat is provided with a mounting cavity, an opening and a flow passage that are respectively in communication with the mounting cavity, an end of the mounting seat where the opening is provided is connected to the valve body, an end of the valve core where the engagement ring is provided is placed into the mounting cavity through the opening, the elastic member is abutted between the end of the valve core where the engagement ring is provided and an end of the mounting seat away from the opening, and the elastic member is configured to provide a restoring force for moving the valve core towards the second end.

20. The sealing valve according to claim 3, further comprising:
an elastic member; and
a mounting seat, configured for mounting the elastic member;
wherein the mounting seat is provided with a mounting cavity, an opening and a flow passage that are respectively in communication with the mounting cavity, an end of the mounting seat where the opening is provided is connected to the valve body, an end of the valve core where the engagement ring is provided is placed into the mounting cavity through the opening, the elastic member is abutted between the end of the valve core where the engagement ring is provided and an end of the mounting seat away from the opening, and the elastic member is configured to provide a restoring force for moving the valve core towards the second end.

* * * * *